(12) United States Patent
Sedlmeier et al.

(10) Patent No.: US 6,350,201 B1
(45) Date of Patent: Feb. 26, 2002

(54) UNIVERSAL JOINT

(75) Inventors: Ralf Sedlmeier, Kamp-Lintfort; Thomas Herlan, Schwelm, both of (DE)

(73) Assignees: plettac Umformtechnik GmbH & Co. KG; Spicer Gelenkwellenbau GmbH & Co. KG, both of (DE)

( * ) Notice: Subject to any disclaimer, the term of this patent is extended or adjusted under 35 U.S.C. 154(b) by 0 days.

(21) Appl. No.: 09/425,478

(22) Filed: Oct. 22, 1999

(30) Foreign Application Priority Data

Oct. 28, 1998 (DE) .......................... 198 49 457

(51) Int. Cl.$^7$ ............................................. F16D 3/16
(52) U.S. Cl. ........................ 464/134; 464/902; 464/905; 403/74
(58) Field of Search ........................ 464/32, 33, 106, 464/112, 134, 135, 905, 902; 403/74, 76, 344

(56) References Cited

U.S. PATENT DOCUMENTS

| | | | |
|---|---|---|---|
| 3,751,080 A | * 8/1973 | Bailey et al. | 74/579 R |
| 4,334,415 A | * 6/1982 | Hopkins et al. | 464/130 |
| 4,684,267 A | 8/1987 | Fetouh | |
| 4,768,995 A | * 9/1988 | Mangiavacchi | 464/135 |
| 4,895,700 A | * 1/1990 | Davison et al. | 464/902 |
| 4,992,076 A | * 2/1991 | Gille et al. | 464/130 |
| 5,135,587 A | 8/1992 | Olaniran et al. | |
| 5,643,090 A | * 7/1997 | Smith | 464/130 |
| 6,056,644 A | * 5/2000 | Lindenthal | 464/135 |

FOREIGN PATENT DOCUMENTS

| EP | 0 206 026 B1 | 10/1988 |
|---|---|---|
| GB | 2 145 947 A | 4/1985 |

* cited by examiner

*Primary Examiner*—Lynne H. Browne
*Assistant Examiner*—Kenn Thompson
(74) *Attorney, Agent, or Firm*—Harness, Dickey & Pierce, P.L.C.

(57) ABSTRACT

The invention relates to a universal joint having a first joint yoke (1) and a second joint yoke (8) as well as a cross member (23) for connecting said yokes. In the region of its two second yoke arms (11), the second joint yoke (8) is separated along a line extending through the second bearing bores, so that per yoke arm (11), there are obtained two yoke arm portions (15) continuing to be connected to the base portion (9), and a separate bridge portion (16). Separation takes place in the form of fracture separation, for which purpose regions in the second bearing bores are heat-treated by laser along a line; thereafter, a force applied to and concentrating on said regions leads to fracture faces which correspond to brittle fracture faces, so that after the separating operation, joining can easily take place without the bearing bores subsequently having to be re-machined. In this way, assembly is simplified.

10 Claims, 2 Drawing Sheets

UNIVERSAL JOINT

CROSS-REFERENCE TO RELATED APPLICATIONS

This application claims priority upon German application 198 49 457.2 filed Oct. 28, 1998, which is incorporated herein by reference.

BACKGROUND OF THE INVENTION

The invention relates to a universal joint with a first joint yoke and a second joint yoke. The yokes are connected to one another by a cross member with a bearing bush and intermediate rolling contact members. Thus, the yokes articulate around two axes. The two joint yokes each include two yoke arms. Bearing bores extend through the yoke arms to accommodate the bearing bushes of the cross member so that they are centered on one axis. These universal joints frequently form part of propeller shafts which include two such universal joints connected to one another by a connecting shaft. Attaching mechanisms are included at the ends to connect with a driving component and driven component, respectively. Such propeller shafts are used in motor vehicles, for example, in the driveline of a motor vehicle, of a commercial vehicle or, for example, in the field of engineering. If they are used in a motor vehicle, flange connections are included for attachment purposes. A first flange is attached to one of the universal joint. The first flange may be connected by a matching flange secured to a gearbox output journal. A second flange may be arranged on an input journal of a further drive, such as the axle drive. The propeller shaft or a driveline composed of several such propeller shafts serves to transmit torque, starting from the driving unit, via the gearbox, to the axle drive. Since the installation space is narrow and the flange connection is difficult to handle, the connection is complicated and expensive. Furthermore, the flanges require a great deal of machining work. Also, due to the high torque values, the flanges are provided with flange faces which engage one another. Further, in the case of heavy propeller shafts, due to the diameter conditions, it is not possible to thread, for assembly purposes, the cross member onto a joint yoke with closed bearing bores. This is the reason why, in the case of such universal joints, the yoke arms are divided, and the bridge members, like the corresponding faces of the yoke arms, have swallow tail guides, for example, to achieve positive form-fitting conditions. Machining such form-fitting connections is expensive. Due to high production costs, this is the reason why the application of such embodiments is limited to driveshafts for particularly high torque values like those that occur in rolling mills.

SUMMARY OF THE INVENTION

It is an object of the present invention to provide a universal joint which can be easily assembled or assembled onto a driveshaft.

In accordance with the invention, a universal joint has a first joint yoke. The first joint yoke includes a first base portion and two first yoke arms which project from the base portion. Each first yoke arm is provided with a first bearing bore. The two first bearing bores are arranged on a common first bore axis, as well as a first longitudinal axis intersecting the first bore axis at a right angle. A second joint yoke is made of steel and includes a second base portion and two second yoke arms. The second yoke arms project from the base and are each provided with a second bearing bore. The two second bearing bores are arranged on a common second bore axis, as well as a second longitudinal axis intersecting the second bore axis at a right angle. The two second yoke arms are separated in the region of their respective second bearing bore. Thus, yoke arm portions are formed which are connected to the respective second base portion. Also, a respective separate bridge portion is formed. The bridge portions and the yoke arm portions, in the region of the parting line with the fracture faces contacting one another, are connected to one another by bolts which pass through the fracture faces. The second yoke arms along the length of the second bearing bores, in each of two diametrically arranged linear regions, are subjected to such a heat treatment and/or separating speed, which leads to the fracture faces having a surface structure which corresponds to a brittle fracture. A cross member with four journals is received in the bores. Two journals are received in the first bearing bores. Rolling contact members and bearing bushes are arranged between the journals and bores. The other two journals are received in the second bearing bores. Likewise, rolling contact members and bearing bushes are arranged between the journals and bores.

An advantage of this embodiment is that with the fracture faces it is possible to achieve a close connection between the bridge portions and the yoke arm portions. This design enables the components to be associated with one another in a certain configuration due to the unique individual characteristics of the fracture faces. The fracture faces provide a tooth or meshing effect. Thus, the faces achieve a close connection in the torque transmitting direction around the longitudinal axis and require a small number of bolts. Preferably, only one bolt per pair of fracture faces. The heat treatment, in a concentrated way, results in material embrittlement in the region of the bearing bores. The heat treatment need only extend down a short distance to achieve an advantageous separation, similar to a brittle fracture. As an alternative, it is also possible to influence the condition of the fracture face by the speed of the separating operation. The heat treatment and separating speed are adapted to one another such that the surface structure, in the region of the fracture faces, corresponds to that achieved by a brittle fracture. In a preferred embodiment, steel is used which advantageously affect the brittle fracture behavior. For instance, steel with a carbon content equal to or greater than 0.38%, preferably a carbon content of 0.7% to 0.8% are used. The steel also includes small amounts of alloying elements. In an advantageous embodiment, a steel with 0.01% to 0.06% of sulfur or, optionally, 0.60% to 1.46% of manganese is used.

In the course of the production process, it is possible for the two second bearing bores of the joint yoke to be machined to their end condition prior to separation. The two second joint yokes are subjected to a force influence, starting from the two second bearing bores for separation purposes. The applied force preferably concentrates on the respective diametrically arranged linear regions of the second bearing bores. The heat treatment can be carried out by a laser beam. Suitable steels which meet the respective requirements are preferably steels of the following grades: 38MnSiVS5, 80MnS, C70S6BY, C45MnSBY and C50MnSBY. As a result of the heat treatment, martensite is formed in the treated region. This formation advantageously affects the brittle fracture behavior characteristics. Care must be taken during the separating operation to ensure that separation takes place as quickly as possible in those regions which are not subjected to heat treatment because the latter is restricted to a depth which is smaller than the material thickness in the region of the bearing bore. Quick separation is important so that there is no time for the formation of plastically deformed portions. This is important because a certain material toughness is required for torque transmitting purposes.

From the following detailed description, taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
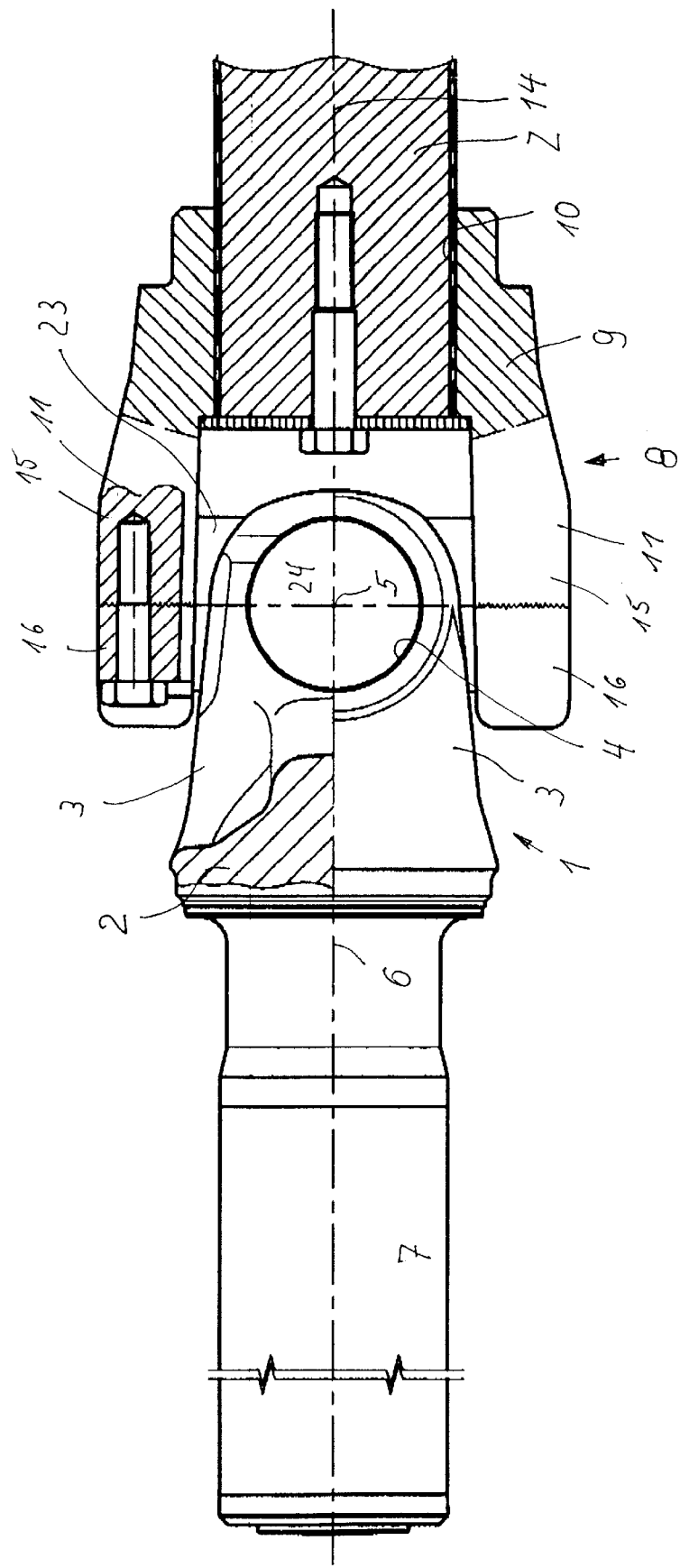
FIG. 1 is a side view partially in section of a universal joint in accordance with the present invention.
Figure 2:
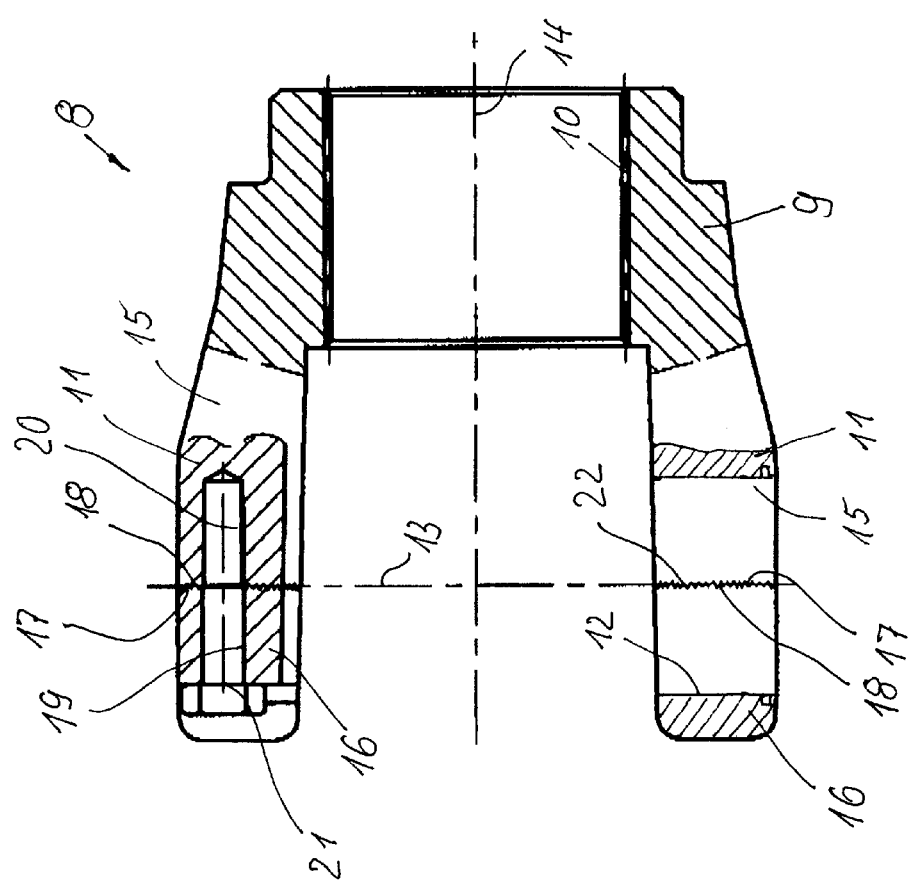
FIG. 2 is a plan view partially in section of the second joint yoke.

FIGS. 1 and 2 will be described jointly below. The universal joint includes a first joint yoke 1 with a first base portion 2 having two radially projecting first yoke arms 3. The first yoke arms 3 are arranged at a radial distance from the first longitudinal axis 6. First bearing bores 4 extend through the two first yoke arms 3. The first bearing bores 4 are arranged on a first common bore axis 5 which intersects the first longitudinal axis at a right angle. The first longitudinal axis 6 and the first bore axis 5 are positioned on one plane. A journal 7 is connected to the first base portion 2. The journal 7 is associated with a connecting shaft. The other end of the connecting shaft may be connected to a further joint yoke of a further universal joint.

The universal joint includes a second joint yoke 8. The second joint yoke 8 includes a second base portion 9 which has a central bore 10. The bore 10 have teeth, for instance, which connect to a journal Z of a toothed gearbox output journal rotationally fast and axially movable. The bore 10 is centered on the second longitudinal axis 14 of the second joint yoke 8. Two second yoke arms 11 axially project from the hub-shaped second base portion 9. The second yoke arms 11 project towards the first base portion 2 of the first joint yoke 1. The two second joint yoke arms 11 are provided with second bearing bores 12. The second bearing bores 12 are centered on a common second bore axis 13. The second bore axis 13 is positioned in the same plane as the second longitudinal axis 14 and intersects it at a right angle.

The second joint yoke 8 is separated by fracture separation in the region of the second yoke arms 11, preferably, in the region of a plane which contains the second bore axis 13. The second bore axis 13 is perpendicular to the second longitudinal axis 14. Thus, per second yoke arm 11, two yoke arm portions 15 are integrally connected to the second base portion 9.

Thus, a separate bridge portion 16 is formed per yoke arm 11. Two fracture faces 17, 18 are formed. A bore for receiving a bolt 21 passes through the fracture faces. A through bore 19 is provided in the region of the fracture faces 18 of each bridge portion 16. Threaded bores 20 are provided in the region of the two yoke arm portions 15 with the fracture faces 17 of the two second yoke arms 11. The two bores 19, 20 are arranged one behind the other and are produced prior to the fracture separation process. Bolts 21 are loosely threaded in to carry out the fracture separation process. A laser beam treatment is carried out in a region starting from the wall of the bores of the second bearing bores 12 along two diametrically arranged lines. Thus, a linear region 22 is subjected to heat treatment. In the material selected, down to a certain depth, the heat treatment causes a change in structure which advantageously affects fracture separation. Fracture separation is also advantageously affected by the already existing bores 19, 20 since the cross-sections are reduced as a result. Subsequently, a load is applied from within. The load is applied from the second bearing bores 12 in a concentrated way to the two linear regions 22 arranged diametrically opposite one another. The load is applied at such a speed that, in the regions not heat treated by the laser, where the structure was not changed to martensite, separation takes place so that the surface structure corresponds to that of a brittle fracture. This objective can be achieved by a rapid separating operation. Thus, the particles in the region of the parting line between the two fracture faces 17, 18 have no time to flow or be plastically deformed.

The first joint yoke 1 and the second joint yoke 8 are connected by a cross member assembly. The assembly includes a cross member 23 with four journals positioned in one plane. Bearing bushings are arranged on the journals with a rolling contact member between the journals and bushings. Only one bearing bushing 24 is visible in FIG. 1. Each two journals have a common axis corresponding to the two bore axes 5, 13. The two first bearing bushings 24 are received in the two first yoke arms 3 of the first joint yoke 1. The two second bearing bushings are centered on the second bore axis 13 and received in the two second bearing bores 12 of the second joint yoke 8.

Assembly can take place such that, first, the cross member 23 with the two bearing bushings 24 is secured in the first joint yoke 1 by first securing rings. Prior to fitting the cross member assembly in the vehicle, the second joint yoke 11 can be secured on the gearbox journal Z. The assembly of the second bearing bushings follows at the second yoke arms 11 of the second joint yoke 8, with the bridge portions removed. Only a short axial assembly path is required. Thus, a propeller shaft with two universal joints can easily be threaded into the vehicle from below. Furthermore, the propeller shaft with such a universal joint is lighter, because the second joint yoke, associated with the gearbox journal Z, is pre-assembled. This also applies in replacement cases. The second bearing bushings are also secured by securing rings after the bridge portions 16 have been fixed in the second yoke arms 11 of the second joint yoke 8.

Separation takes place in the form of fracture separation. For this purpose, heat treatment by laser starts from the second bearing bores 12 and extends along linear regions 22. A force is applied from inside which concentrates on regions 22. Thus, fracture separation takes place. As a result of the heat treatment by laser, the selected separating speed and the selected material, the fracture separation leads to fracture faces which correspond to those of a brittle fracture face. Accordingly, after separation, joining of the faces can take place easily, without the bearing bores subsequently having to be re-machined.

While the above detailed description describes the preferred embodiment of the present invention, the invention is susceptible to modification, variation and alteration without deviating from the scope and fair meaning of the subjoined claims.

What is claimed is:

1. A universal joint comprising:
   a first joint yoke having a first base portion and two first yoke arms projecting from said base, each first yoke arm includes a first bearing bore, said two first bearing bores are arranged on a common first bore axis, a first longitudinal axis intersects the first bore axis at a right angle;

a second joint yoke made of steel having a second base portion and two second yoke arms projecting from said second base, each said second yoke arm including a second bearing bore, said two second bearing bores are arranged on a common second bore axis, a second longitudinal axis intersecting said second bore axis at a right angle, said two second yoke arms being separated in the region of their respective second bearing bore forming yoke arm portions connected to the respective second base portion, as well as respective separate bridge portions, a parting line between said bridge portions and said yoke arm portions, fracture faces on said parting line formed during separating of said bridge portions and said yoke arm portions, said fracture faces contacting one another, said bridge portions and yoke arm portions connected to one another by bolts passing through said fracture faces, and said second yoke arms, along the length of the second bearing bores in each of two diametrically arranged linear regions, being subjected to a heat treatment and/or separating speed leading to said fracture faces having a surface structure which corresponds to a brittle fracture; and a cross member with four journals of which two are received in the first bearing bores, said journals including rolling contact members and bearing bushings, and with the other two journals being received in the two second bearing bores, said journals including rolling contact members and bearing bushing.

2. A universal joint according to claim 1, wherein the second joint yoke is provided with through-bores in the region of the bridge portions to be able to receive the bolts and with threaded bores in the region of the yoke arm portions, which through-bores and threaded bores are produced jointly prior to the separating operation and said bolts engaging the threaded bores during the separating operation.

3. A universal joint according to claim 1, wherein the second joint yoke is steel with a carbon content equal to or greater than 0.38%, preferably 0.7% to 0.8%.

4. A universal joint according to claim 3, wherein the steel contains 0.01% to 0.06% of sulfur.

5. A universal joint according to claim 3, wherein the steel contains 0.60% to 1.46% of manganese.

6. A universal joint according to claim 1 wherein the two second bearing bores of the second joint yoke are in their final condition as machined prior to the separating operation.

7. A universal joint according to claim 1, wherein starting from the two second bearing bores of the second joint yoke are subjected to the influence of a force for the purpose of being separated.

8. A universal joint according to claim 7, wherein the application of force is concentrated on the respective diametrically arranged linear regions of the second bearing bores.

9. A universal joint according to claim 1, wherein the heat treatment is carried out by a laser beam.

10. A universal joint according to claim 4, wherein the steel contains 0.60% to 1.46% of manganese.

* * * * *